(12) United States Patent
Hidas et al.

(10) Patent No.: US 11,687,073 B2
(45) Date of Patent: Jun. 27, 2023

(54) SPECIALIST CONTROL FOR A WHEELCHAIR

(71) Applicant: MUNEVO GMBH, Munich (DE)

(72) Inventors: Claudiu Hidas, Munich (DE); Julius Baron, Munich (DE); Aashish Trivedi, Munich (DE); Deepesh Pandey, Neufahrn Bei Freising (DE); Konstantin Madaus, Munich (DE)

(73) Assignee: MUNEVO GMBH, Munich (DE)

( * ) Notice: Subject to any disclaimer, the term of this patent is extended or adjusted under 35 U.S.C. 154(b) by 464 days.

(21) Appl. No.: 16/626,828

(22) PCT Filed: Jun. 29, 2018

(86) PCT No.: PCT/EP2018/067686
§ 371 (c)(1),
(2) Date: Dec. 26, 2019

(87) PCT Pub. No.: WO2019/002597
PCT Pub. Date: Jan. 3, 2019

(65) Prior Publication Data
US 2020/0117184 A1    Apr. 16, 2020

(30) Foreign Application Priority Data
Jun. 29, 2017  (DE) .......................... 102017114569.9

(51) Int. Cl.
*G05D 1/00*   (2006.01)
*A61G 5/10*   (2006.01)
(Continued)

(52) U.S. Cl.
CPC ............. *G05D 1/0016* (2013.01); *A61G 5/10* (2013.01); *G06F 3/017* (2013.01); *G10L 15/22* (2013.01);
(Continued)

(58) Field of Classification Search
CPC ......... G05D 1/0016; G05D 2201/0206; A61G 5/10; G06F 3/017; G10L 15/22; G10L 2015/223
(Continued)

(56) References Cited

U.S. PATENT DOCUMENTS

| 9,423,827 B2 * | 8/2016 | Compton ................ G06F 3/012 |
| 2012/0143400 A1 * | 6/2012 | Hinkel, III .............. G06F 3/014 701/2 |

(Continued)

FOREIGN PATENT DOCUMENTS

| EP | 3 076 906 A1 | 10/2016 |
| WO | WO-2015/082947 A1 | 6/2015 |

OTHER PUBLICATIONS

Anonymous, "Android App to remotely control a robot with the accelerometer via Bluetooth, Robots en la UPV," Jul. 17, 2015. Retreived from the Internet at: URL:http://robotica.webs.upv.es/en/andfoid-app-robot-accelerometer-bluetooth/.
(Continued)

*Primary Examiner* — Krishnan Ramesh
(74) *Attorney, Agent, or Firm* — Marshall, Gerstein & Borun LLP

(57) ABSTRACT

The invention relates to a special controller for an electric wheelchair (D), comprising an element for inputting commands (input element) and an adapter box (B) for transmitting data of the input element to an input/output module (C) of the electric wheelchair (D), wherein the data of the input element are transmittable wirelessly to the adapter box (B) and the input element comprising a wearable computer system (wearable) (A).

19 Claims, 2 Drawing Sheets

(51) Int. Cl.
*G06F 3/01* (2006.01)
*G10L 15/22* (2006.01)
(52) U.S. Cl.
CPC .......... *G05D 2201/0206* (2013.01); *G10L 2015/223* (2013.01)
(58) Field of Classification Search
USPC ............................................. 701/2
See application file for complete search history.

(56) References Cited

U.S. PATENT DOCUMENTS

| | | | | |
|---|---|---|---|---|
| 2015/0253975 A1* | 9/2015 | Pettigrew | ............ | G06F 3/04842 715/772 |
| 2015/0346813 A1* | 12/2015 | Vargas | ............ | G06F 3/017 345/8 |
| 2016/0052137 A1* | 2/2016 | Hyde | ............ | G05D 1/0242 701/28 |
| 2016/0131902 A1* | 5/2016 | Ambrus | ............ | G06F 3/013 345/156 |
| 2016/0246384 A1* | 8/2016 | Mullins | ............ | G06F 3/017 |
| 2017/0189250 A1* | 7/2017 | Juhasz | ............ | B60L 15/20 |
| 2018/0036185 A1* | 2/2018 | Han | ............ | G06F 3/015 |
| 2018/0275837 A1* | 9/2018 | Getz | ............ | G06F 3/012 |
| 2021/0023934 A1* | 1/2021 | Gillett | ............ | B62K 21/12 |

OTHER PUBLICATIONS

Burfield, "Lego Mindstorms Wheelchair Controlled via Google Glass," Jan. 7, 2015. Retreived from the Internet at: URL:https://www.youtube.com/watch?v=bL1APYRhw04.

International Search Report and Written Opinion for Application No. PCT/EP2018/067686, dated Oct. 12, 2018.

Martin Haldenmair, "So steuert man mit Google Glass einen Rollstuhl," May 15, 2015. Retreived from the Internet at: URL:https://www.gallieo.tv/tech-trends/so-steuert-man-mit-google-glass-einen-rollstuhl/.

* cited by examiner

SPECIALIST CONTROL FOR A WHEELCHAIR

TECHNICAL FIELD

The invention relates to a special controller for an electric wheelchair, comprising an element for inputting commands (input element) and an adapter box for transmitting data of the input element to an input/output module of the electric wheelchair.

BACKGROUND

For some patients who are dependent on a wheelchair, it is not reasonable or not possible to move the wheelchair with their own muscle power. An electrically operated wheelchair then represents a suitable means for conveyance for these patients. Certain patients dependent on an electric wheelchair are moreover physically disabled in such a way that they are dependent on a special controller of the wheelchair. Special controllers are generally understood in this case as all types of controllers which deviate from a standard controller and/or a standard operation of the wheelchair via a standard driver control panel having joystick.

Special controllers, in particular sip-and-puff controllers and controllers by means of special joysticks are known for controlling an electric wheelchair. These include so-called head arrays and chin controllers, using which, for example, paraplegic patients are capable of controlling an electric wheelchair with the aid of the head. For the control, either the head movement remaining to the patient or also other remaining physical functions, for example, the respiration, are used to transmit corresponding driving commands to the wheelchair.

In the previously known solutions, in general the primary detection of the driving commands, for example, the movement of the chin, is essentially implemented via special components (hardware). The known special controllers thus consist of various components, which have to be installed either on the wheelchair and/or on the patient himself. Primarily, a reliable detection of the driving commands of the patient is to be enabled by these components. External control units which are connected via interfaces to the components for detecting the driving commands then convert the driving commands via an installed motor into actual movements of the wheelchair. The known special controllers are generally sold by medical supply stores to end customers and adapted more or less fixedly to the movement patterns of the respective patients.

In many previously known special controllers, an initial adaptation of the control parameters to the respective patient is performed. In the case of sip-and-puff controllers, the patient controls the wheelchair here by sucking and blowing on a tube, for example, the adaptation is performed as to how strongly the patient has to suck on the tube or blow in the tube to trigger a specific movement of the wheelchair.

In the case of chin controllers, the patient controls the wheelchair here with the aid of a joystick attached in front of the chin, the positioning of the joystick and the setting of how sensitively the joystick is to react to touches of the patient are performed initially. Similar settings are also necessary in the case of special controllers via other joysticks, which the patient can operate, for example, using the hand or the foot.

The previously known systems have a variety of disadvantages, however.

For the known special controllers, the installation of dedicated hardware on the wheelchair is fundamentally necessary. This is complex, costly, and generally moreover results in losses in the aesthetic appearance of the wheelchair and the comfort for the patient.

The high production costs of known special controllers result in high end-customer prices. Due to the high end-customer prices, known special controller systems can only be acquired by persons who have the costs paid by the health insurance or privately have corresponding financial means.

Unfortunately, many illnesses which bind a patient to the wheelchair run progressively. This makes necessary regular readjustments, namely the subsequent adaptations of the components (hardware) or new settings of the control parameters (software). These readjustments are time-consuming and are only sometimes performed at no cost out of goodwill.

Due to the hardware focus of known systems, they lack all feedback mechanisms and/or safety precautions which reliably prevent unintentionally triggered control signals and/or the conversion of such signals into movements of the wheelchair, for example, a collision with the wall or driving down staircases or tall steps.

Previously known special control systems also have the disadvantage that these special controllers are generally oriented very strongly to a specific operating mode and thus very strongly to a specific (remaining) capability of the patient, which also explains the high number of respective contraindications. This can have the result that a patient possibly has to purchase new systems and also learn them again and again in the event of a change of their health status.

Specific special controllers can result in consequential damage in the patient due to often unnatural posture during operation or in the event of unsuitable alignment of the components. Chin controllers, for example, can result in jaw pain and also in permanent poor posture.

The wheelchair control via known special controller systems is also often described by many patients as unintuitive, cumbersome, and even faulty, which sometimes makes a tedious learning phase necessary and can result in accident-relevant situations.

Not least, known special controllers can only be used to operate the wheelchair functions as such. Further accessories are necessary, for example, to also perform an environmental control (smart home) from the wheelchair.

SUMMARY

It is the object of the invention to provide a special controller for electric wheelchairs which does not have the mentioned disadvantages of the prior art.

This object is achieved according to the invention by a special controller according to Claim 1, i.e., proceeding from a special controller of the type specified at the outset, the object is achieved in that the data of the input element are wirelessly transmittable to the adapter box and the input element comprises a computer system (wearable) wearable on the body.

Advantageous designs are respectively the subject matter of the dependent claims. It is to be noted that the features listed individually in the claims can also be combined in an arbitrary and technically reasonable manner with one another and can thus disclose further designs of the invention.

A special controller according to the invention comprises an element for inputting commands (input element), in particular a wearable computer system (wearable) having sensors, for example, smart glasses (SmartGlass), an adapter box for transmitting the data of the wearable to an input/output module of the electric wheelchair, and optionally further sensors, in particular for attachment on the wheelchair to be controlled using the special controller. The term "electric wheelchair" is to be understood in the meaning of this invention as representative of all motorized wheelchairs, the drive of which thus does not require muscle power. In contrast, a certain muscle power can be necessary for the operation of the special controller. The input/output module of the electric wheelchair is a defined interface to its electrical drive and steering system.

In particular smart glasses, such as the miniature computer of the American company Google worn on the head, which is commercially available under the tradename "Google Glass", are suitable as the wearable used according to the invention. This device comprises an optical display screen, which is installed in the periphery of the field of view on a glasses frame. The perception of items of information overlaid in the field of view is independent in this case of the head position.

The sensors integrated into the wearable acquire the movements, speech expressions, or vocalized expressions of the wheelchair driver. The acquired data are converted by an application in the wearable into corresponding driving commands. Suitable sensors in the wearable, via which the patient can communicate with the special controller, comprise, for example, movement sensors (for example, gyroscopes) and auditory sensors (for example, microphones). The data of the various sensors can also be linked (sensor fusion), in order to increase the quality and accuracy of the commands upon the analysis of the input.

The wearable transmits the driving commands wirelessly (for example, by means of Bluetooth) to the adapter box, which is attachable to the wheelchair to be controlled. The signals are then relayed in a wired or wireless manner to the input/output module (I/O module) from the adapter box. Most electrically operated wheelchairs having special controllers presently use already standardized I/O modules, so that the special controller according to the invention is immediately attachable and immediately usable on most wheelchair models via the adapter box. The I/O module is connected to the drive and electronics of the wheelchair and closes the control loop. The wheelchair may thus be moved, the speed of the wheelchair may be adapted, or, for example, the seat position may be changed via the wearable.

One essential advantage of the present invention is that the command input is no longer bound to complicated, costly, and individually adjusted hardware, but rather the command input takes place via a universal input medium, namely a wearable. A decisive step away from highly specialized individual case solutions toward an essentially universal solution thus takes place.

To generate driving commands, the wearable is expediently configured to convert signals of the integrated sensors according to calibration data stored in the working memory of the wearable into commands, which are then transmitted to the input/output module of the electric wheelchair for its control. The calibration data specify, for example, how a head movement of the user of the wheelchair detected by means of an integrated acceleration sensor is interpreted as a driving command. The calibration data thus assign, for example, a specific control function (for example, forward/backward travel) to a specific direction of the head movement and convert the amplitude of the detected head movement into a corresponding proportional intensity of the control command (0%-100%, i.e., for example, slow to maximum speed forward or backward travel). All parameters of this conversion are comprised by the calibration data. The calibration data are individually adaptable to the movement capabilities of the user with little effort.

In one preferred embodiment, the wearable is configured to activate a calibration mode, in which the calibration data are adaptable by the user of the electric wheelchair himself. The user of the wheelchair can in this manner independently learn the movements which they wish to use, for example, for specific driving commands. If, for example, movement patterns change in the course of illness or because of a varying daily condition, the patient can himself recalibrate the special controller quickly at any time. The special controller according to the invention is thus adaptive and the complex reconfigurations—in particular also of the hardware—by medical supply stores after purchase are dispensed with. The customer not only saves the time required for this purpose, but rather additionally reclaims quality of life and self-determination.

If the wearable is a pair of smart glasses, the user can navigate through a displayed menu with the aid of the included display screen via head movements. Via a menu item calibration, the user can activate the calibration mode and perform the calibration of both the driving gestures and also the gestures for the menu control. In this case, the sensor values are ascertained in accordance with the deflections of the various movement gestures which are the maximum possible or desired for the user. The values of each gesture thus acquired are stored and define the maximum speed and/or the tightest curve radius.

In addition, the calibration mode can be used to recognize variations of the base position of the user, which is associated with the standstill of the wheelchair, for example, due to tremors. These base variations are then filtered out in subsequent use (see below). The detected sensor signals in the base position are defined as minimal values, the exceeding of which is first interpreted as an intentional signal and accordingly further processed.

The calibration of the control gestures which are detected by means of the integrated sensors of the wearable may be carried out independently of a previously defined direction. The algorithm running in the calibration mode of the wearable recognizes the movement scope of a gesture and its direction. This means that the user is capable of configuring the controller precisely to their movement intentions and capabilities. For example, the algorithm can be designed so that the wearable generates a request to incline the head in a position for "forward travel" during the calibration. The user can then incline the head in any direction. The direction is not predetermined. People having strong restrictions of one body side, for example, thus have the option of driving the wheelchair autonomously and independently.

In a further preferred design, the wearable is configured to filter the signals of the sensors during the conversion into commands, in such a manner that the conversion takes place as a function of the amplitude and/or the speed of change of the signals. For example, the wearable can be configured not to convert signals of the sensors, the amplitude of which is less than an amplitude threshold value and/or the speed of change of which is greater than a speed limiting value, into commands, which are transmitted to the input/output module of the electric wheelchair. The control via the wearable thus enables the filtering of spasms and other jerky/rapid movements. For example, for nodding movements, detected with the aid of an integrated gyroscope, sensor data are compared directly to threshold values contained in the calibration data. Filtering with respect to the speed of change of the sensor signals is also possible for the proportional driving gestures, which are ascertained with the aid of acceleration sensors. This takes place, for example, via comparisons of two chronologically directly successive values of the relevant sensor signal. If the difference of the successive values is greater than a threshold value, the movement is excessively fast and signal further processing does not take place.

These filtering options also offer people having spasticity a required level of safety in the control of electric wheelchairs via the head movement in general and especially with the aid of smart glasses.

In the case of the expanded operation of an environmental controller (smart home) as well, the signals of the wearable are accordingly transmitted via Bluetooth to the control interface of the smart home controller.

In one preferred embodiment of the special controller, additional sensors are attachable to the wheelchair, which are to prevent the user from driving into obstacles or falling down steps, for example. Such sensors comprise in particular distance sensors, optical sensors, for example, cameras, acoustic sensors, for example, microphones, or movement sensors. Further suitable sensors are known to a person skilled in the art and are selectable thereby depending on the object without exercising further inventive skill. The sensors can be connected (in a wired or wireless manner) to the adapter box and/or to the wearable, where the sensor data are processed accordingly for the wheelchair control.

Comparable safety systems, which can ensure that the wheelchair driver does not drive into a wall or into an abyss, for example, due to an uncontrolled movement or vocal expression, for example, because of a spasticity, do not exist in any known control solution, not even in those having standard control panels with joystick. However, such hazards can be recognized via sensors installed on the wheelchair. If the wheelchair approaches, for example, a wall, a staircase, or a ledge, this risk is recognized by the sensor or sensors and the wheelchair is automatically stopped. Narrow passages can also be recognized and traversed autonomously with the aid of distance sensors.

Moreover, cameras and a machine learning algorithm can be integrated into the special controller and/or the safety system for the object recognition. This is thus a learning control and safety system which can analyze the recognized objects and classify them accordingly according to "hazard" or "not a hazard".

In a further preferred design, the wearable comprises a communication interface to a public communication and/or data network. This can be, for example, a WLAN interface or a mobile wireless interface, via which a mobile telephone and/or Internet connection can be established. The wearable can be configured accordingly to make contact with a predefined person (stored email address or telephone number) in the event of existing communication connection and in emergency situations. This person is then informed about the location of the user of the wheelchair and can in turn make contact with the user and come to their aid if necessary. This enables an enhanced private sphere for the user of the wheelchair, since a helper does not have to be continuously present, with enhanced safety at the same time.

A further type of making contact for wheelchair drivers exists via the telephone function. The user of the smart glasses can additionally telephone autonomously with other people.

Furthermore, the wearable, which is used according to the invention for controlling an electric wheelchair, can also be used for controlling external digital terminals, for example, smart phone, computer, tablet, smart home hub, without further/additional hardware module. The smart glasses controller enables this thanks to the option of being able to install and control further applications and to use the integrated Bluetooth or WLAN interface at the same time.

The wireless transmission of the data of the input element to the adapter box according to the invention is preferably encrypted. The encryption of the data transfer via Bluetooth between the wearable (smart glasses) as an operating element for the wheelchair control and the wheelchair (via the adapter box) is advisable in particular to ensure the safety of the wheelchair driver. Connections to an incorrect input device in the surroundings are prevented, as are unauthorized accesses by third parties.

A universal control unit for the everyday use of disabled people is provided by the special controller according to the invention due to the plurality of further functions (for example, wheelchair-suitable navigation, smart home automation, etc.), which can be incorporated into the special controller.

A further essential advantage of the present invention is that due to the use of smart glasses, a mass-produced product is used and the production costs for the hardware of niche products are thus dispensed with.

The invention and the technical environment are explained in greater detail hereafter on the basis of the figures. It is to be noted that the figures show a particularly preferred embodiment variant of the invention. However, the invention is not restricted to the embodiment variant shown. In particular, the invention comprises, insofar as it is technically reasonable, arbitrary combinations of the technical features which are listed in the claims or described as relevant to the invention in the description.

DETAILED DESCRIPTION

Figure 1:
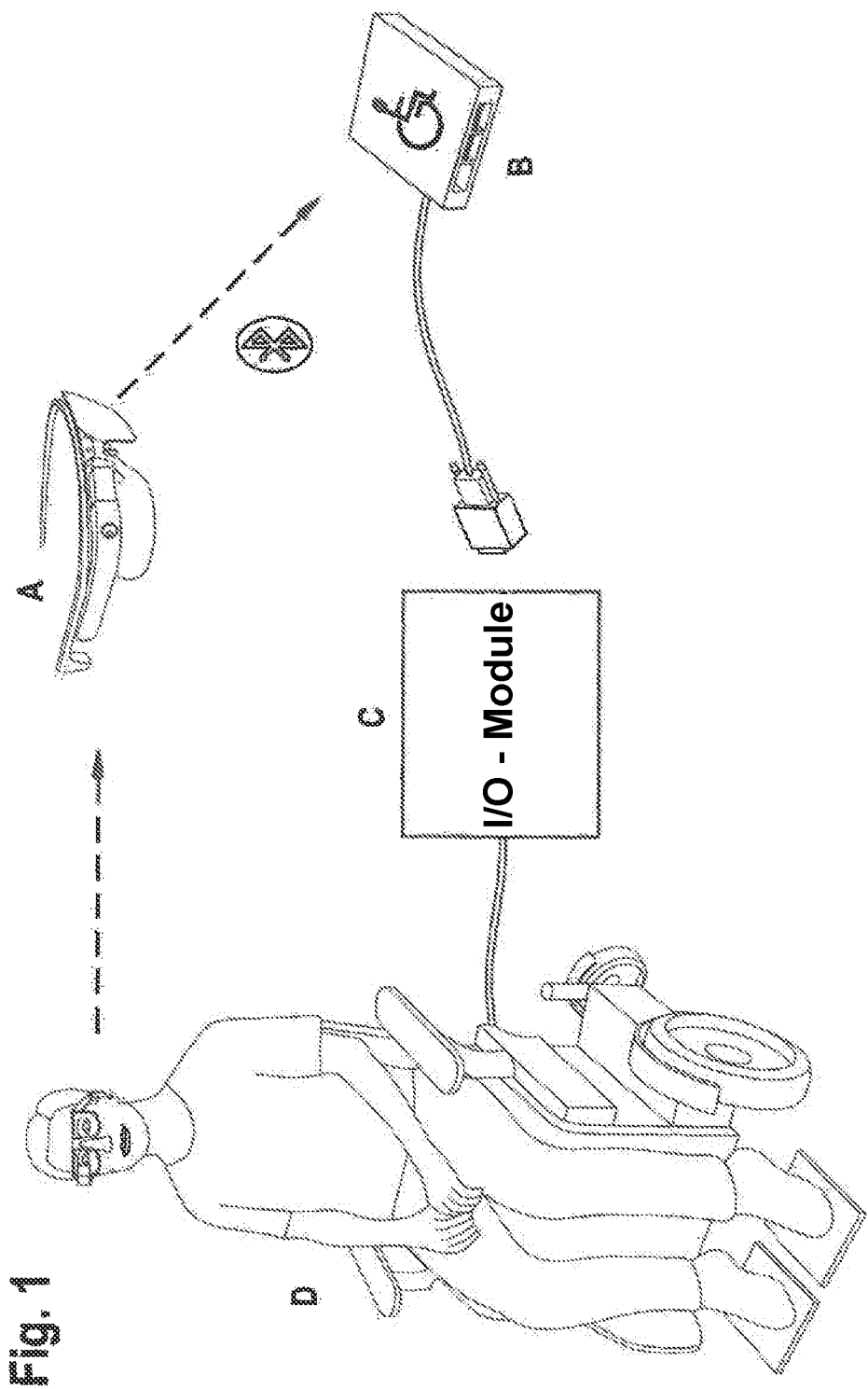
FIG. 1 shows a schematic illustration of one embodiment of the special controller according to the invention.

FIG. 1 shows the functionality of one preferred embodiment of the special controller according to the invention. Head movements and speech commands of the wheelchair driver are acquired by the wearable (A), for example, smart glasses (for example, "Google Glass") and converted into a command in an installed application. The commands, for example, driving commands, are then transmitted wirelessly, for example, via Bluetooth, to the adapter box (B), from which they are relayed via a wire or wirelessly to the input/output module (C). The input/output module (C) is connected to the controller of the wheelchair (D) and closes the control loop. In this manner, the wheelchair (D) may be moved and the seat position and speed of the wheelchair (D) may be adapted.

In the case of the operation of an environmental controller (smart home), the signals of the wearable are transmitted wirelessly, for example, via Bluetooth, to the corresponding control interface of, for example, the smart home.

Figure 2:
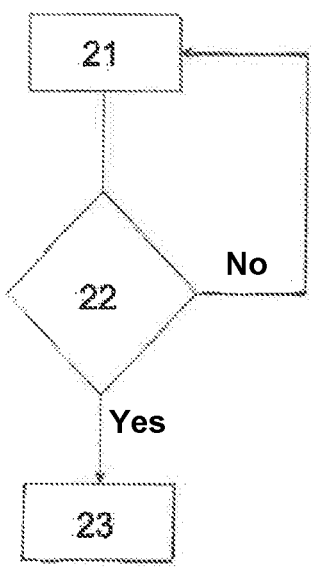
FIG. 2 shows a flow chart of the menu control using the wearable according to the invention via gestures.

FIG. 2 illustrates the implementation of the gesture control for the menu control of the smart glasses A. The smart glasses A overlay a menu selection in the field of view of the user, as is generally typical in the case of user interfaces of electronic devices. The query of the integrated gyroscope of the smart class A takes place in step 21. In step 22, the detected instantaneous angular velocity in a specific direction is compared to a reference value previously defined via calibration (see below). If the angular velocity is less than the threshold value given by the reference value, the algorithm returns to the query of the gyroscope. Otherwise, in step 23, the detection of a nodding movement and thus a menu operation is established, which, depending on the operating context and movement direction, can be, for example, a menu selection or a menu navigation.

Figure 3:
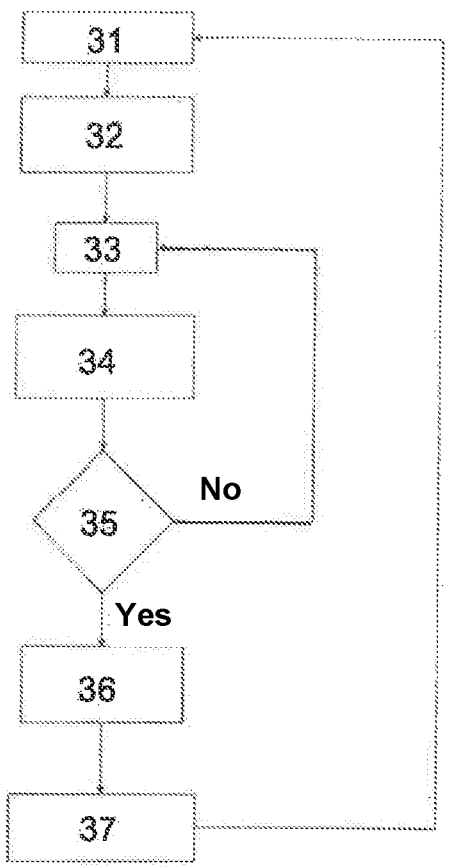
FIG. 3 shows a flow chart of the calibration of the gesture control for the menu control.

FIG. 3 illustrates the calibration of the gesture control for the above-described gesture control for the menu control. The illustrated algorithm runs in a calibration mode which the user of the wheelchair D can activate at any time. In step 31, the query of the gyroscope again takes place. During a period of time, for example, of 2-10 seconds, in step 32, the detected angular velocities are recorded, during which no gestures are exerted. The reference values thus obtained indicate the extent of the idle movement of the user, which can be caused, for example, by a tremor. These reference values are a component of the calibration data and can be filtered out during the detection of control gestures. In step 33, the user is then requested to execute a specific movement, for example, a nodding movement provided for a menu operation. In step 34, the maximum angular velocity detected during the execution of the movement is recorded. In step 35, it is queried whether the movement to be calibrated was already executed N times, wherein N is an arbitrary predetermined number which specifies the required number of repetitions of the gesture for the purposes of the calibration. In step 36, the average detected angular velocity in the N repetitions is then determined and stored in step 37 as a threshold value for the gesture recognition in the calibration data. These steps are then repeated for various movement directions (for example, up, down, left, right).

Figure 4:
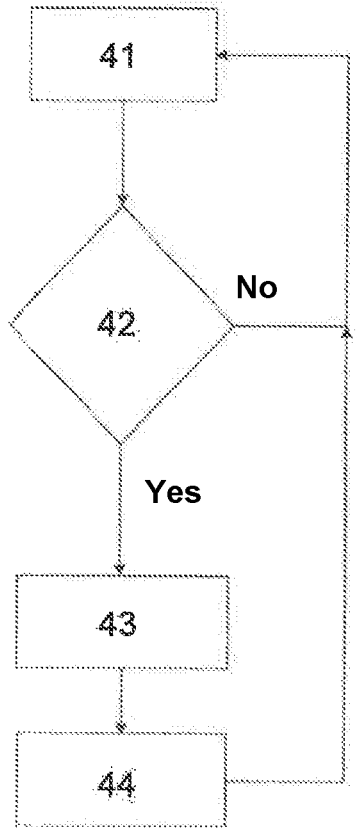
FIG. 4 shows a flow chart of the driving control using the wearable according to the invention via gestures.

FIG. 4 shows the flow chart for the gesture control of the driving control of the wheelchair D. In step 41, the acceleration sensors of the smart glasses A are queried. In step 42, the measured acceleration values are compared to the reference values of the calibration data to establish whether an intentional control gesture was actually executed by the user or whether only an idle movement exists. If the measured values are less than the reference values, the algorithm returns back to the sensor query 41. Otherwise, in step 43, the measured acceleration values are analyzed and converted on the basis of the stored calibration data into a proportional driving command (for example, according to the instantaneous head inclination angle derived from the acceleration values). In step 44, the driving command is then relayed to the input/output module C, so that the wheelchair D executes the movement according to the driving command. The algorithm then returns back to the query of the acceleration sensor in step 41.

Figure 5:
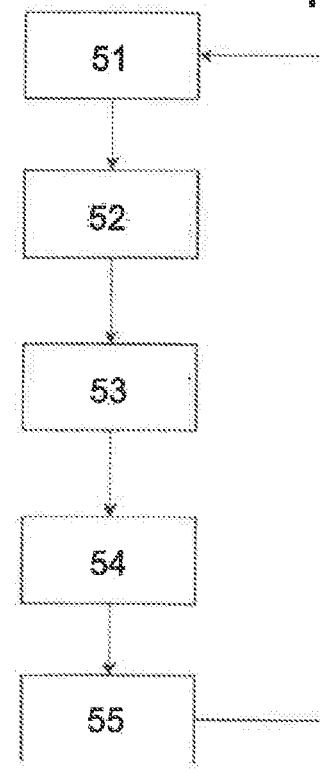
FIG. 5 shows a flow chart of the calibration of the gesture control for the driving control.

The calibration of the gesture control for the driving control can be performed as illustrated in FIG. 5. In step 51, the acceleration sensors are queried. During a period of time, for example, of 2-10 seconds, in step 52, the detected acceleration values are recorded, during which no gestures are exerted. The reference values thus obtained indicate the extent of the idle movement of the user, which can be caused, for example, by a tremor. These reference values are a component of the calibration data and are filtered out during the detection of the control gestures, as described above. In step 53, the user is then requested to assume a head inclination provided for a specific movement, for example, for a specific driving function (forward, backward, left, right). In step 54, the maximum deviation from the reference values detected during the execution of the movement is determined and stored as a maximum value (100%) for the corresponding driving function. The value interval of the proportional driving command (reference value to maximum value) is thus defined, on which the extent of the respective detected movement is mapped during the driving control. In step 55, this value is stored in the calibration data. The procedure is then repeated for the various directions.

A dynamic calibration is also conceivable, in which the maximum extent of the detected movement gesture (continuously or at specific points in time) is monitored and the calibration data are adapted accordingly.

The invention claimed is:

1. A special controller for an electric wheelchair having an input/output module, comprising
an input element for inputting commands
wherein the input element comprises a wearable
including a pair of smart glasses adapted to enable the user to navigate through a displayed menu with the aid of an included display screen via gestures;
wherein the wearable further comprises sensors and a processor that is configured to store wheelchair driving calibration data in the wearable and to convert signals of the sensors according to the wheelchair driving calibration data stored in the wearable into wheelchair driving commands, and
wherein the wearable is further configured to activate a calibration mode upon selection of a menu item via the displayed menu, wherein, when in the calibration mode, the wearable uses the sensors to detect one or more gestures of the user and uses the detected one or more gestures of the user to determine the wheelchair driving calibration data, and
an adapter box for wirelessly receiving the wheelchair driving commands from the wearable and for transmitting the wheelchair driving commands to the input/output module of the electric wheelchair.

2. The special controller according to claim 1, characterized in that the wearable comprises sensors for recognizing speech and movement.

3. The special controller according to claim 1, characterized in that the special controller comprises further sensors which are attachable to the wheelchair.

4. The special controller according to claim 3, characterized in that the further sensors are selectable from the group comprising distance sensors, optical sensors, acoustic sensors, and movement sensors.

5. The special controller according to claim 4, characterized in that the further sensors are connectable in a wireless or wired manner to the wearable or to the adapter box.

6. The special controller according to claim 1, characterized in that the wearable is configured to filter the signals of the sensors during the conversion into the wheelchair driving commands, in such a manner that the conversion takes place as a function of the amplitude and/or the speed of change of the signals of the sensors.

7. The special controller according to claim 1, characterized in that the wearable is configured not to convert signals of the sensors, the amplitudes of which are less than an amplitude threshold value and/or the speed of change of which is greater than a speed limiting value, into the wheelchair driving commands which are transmitted to the input/output module of the electric wheelchair.

8. The special controller according to claim 1, characterized in that the wearable comprises a communication interface to a public communication and/or data network.

9. The special controller according to claim 1, characterized in that the wireless transmission of the data of the input element to the adapter box is encrypted.

10. An electric wheelchair, characterized by a special controller according to claim 1.

11. The special controller of claim 1, wherein, when in the calibration mode, the wearable uses the sensors to detect one or more gestures of the user when in an idle position, and uses the detected one or more gestures of the user when in the idle position to determine a reference value for use in determining one or more wheelchair driving commands.

12. The special controller of claim 11, wherein the one or more detected gestures comprises one or more head movements of the user.

13. The special controller of claim 11, wherein the one or more detected gestures comprises one or more verbal utterances of the user.

14. The special controller of claim 1, wherein, when in the calibration mode, the wearable uses the sensors to detect one or more maximum gestures of the user and uses the detected one or more maximum gestures to determine one or more maximum gesture values for use in determining at least one wheelchair driving command for a particular wheelchair driving motion.

15. The special controller of claim 14, wherein, when in the calibration mode, the wearable further uses the sensors to detect one or more idle gestures of the user when in an idle position, and uses the detected one or more idle gestures of the user when in the idle position to determine a reference value, and wherein the wearable further computes a wheelchair driving command for the particular wheelchair driving motion based on a ratio of the reference value to the one or more maximum gesture values.

16. A method of controlling an electric wheelchair, comprising:
receiving commands via a wearable having an input element including a pair of smart glasses adapted to enable the user to navigate through a displayed menu with the aid of an included display screen via gestures; and
wirelessly transmitting data of the input element to an input/output module of the electric wheelchair for use in controlling the electric wheelchair;
wherein the wearable includes sensors and further including, using a processor of the wearable convert signals of the sensors according to calibration data stored in the wearable into wheelchair driving commands which are transmitted to the input/output module of the electric wheelchair, and
enabling, upon selection of a menu item in the displayed menu, activation of a calibration mode on the wearable in which the calibration data are adaptable by the user of the electric wheelchair, and further including, when the wearable is in in the calibration mode, using the sensors to detect one or more gestures of the user and using the detected one or more gestures of the user to determine the wheelchair driving calibration data.

17. The method of claim 16, further including, when in the calibration mode, using the sensors to detect one or more gestures of the user when in an idle position, and using the detected one or more gestures of the user when in the idle position to determine a reference value for use in determining one or more wheelchair driving commands.

18. The method of claim 16, further including, when in the calibration mode, using the sensors to detect one or more maximum gestures of the user and using the detected one or more maximum gestures to determine one or more maximum gesture values for use in determining at least one wheelchair driving command for a particular wheelchair driving motion.

19. The method of claim 18, further including, when in the calibration mode, using the sensors to detect one or more idle gestures of the user when in an idle position, and using the detected one or more idle gestures of the user when in the idle position to determine a reference value, and further including computing a wheelchair driving command for the particular wheelchair driving motion based on a ratio of the reference value to the one or more maximum gesture values.

* * * * *